US010481310B2

(12) United States Patent
Sears (10) Patent No.: US 10,481,310 B2
(45) Date of Patent: Nov. 19, 2019

(54) HARD CANDY OPTICS

(71) Applicant: Jasmine Soria Sears, Tucson, AZ (US)

(72) Inventor: Jasmine Soria Sears, Tucson, AZ (US)

( * ) Notice: Subject to any disclaimer, the term of this patent is extended or adjusted under 35 U.S.C. 154(b) by 69 days.

(21) Appl. No.: 15/426,880

(22) Filed: Feb. 7, 2017

(65) Prior Publication Data

US 2017/0227679 A1 Aug. 10, 2017

Related U.S. Application Data

(60) Provisional application No. 62/292,389, filed on Feb. 8, 2016.

(51) Int. Cl.

| | |
|---|---|
| *A23G 3/50* | (2006.01) |
| *G02B 1/00* | (2006.01) |
| *G02B 1/04* | (2006.01) |
| *G02B 25/00* | (2006.01) |
| *G02B 5/22* | (2006.01) |
| *G02B 7/02* | (2006.01) |
| *A23G 3/56* | (2006.01) |
| *A23G 3/36* | (2006.01) |
| *A23G 3/42* | (2006.01) |
| *A23G 3/54* | (2006.01) |

(52) U.S. Cl.
CPC ............... *G02B 5/223* (2013.01); *A23G 3/36* (2013.01); *A23G 3/42* (2013.01); *A23G 3/50* (2013.01); *A23G 3/54* (2013.01); *A23G 3/563* (2013.01); *G02B 1/00* (2013.01); *G02B 1/04* (2013.01); *G02B 1/041* (2013.01); *G02B 25/002* (2013.01); *A23V 2002/00* (2013.01); *G02B 7/02* (2013.01)

(58) Field of Classification Search
CPC . G02B 5/223; G02B 1/00; G02B 1/04; G02B 1/041; G02B 25/002; G02B 7/02; A23G 3/36; A23G 3/42; A23G 3/50; A23G 3/54; A23G 3/563; A23V 2002/00
USPC ......................................................... 359/772
See application file for complete search history.

(56) References Cited

U.S. PATENT DOCUMENTS

| | | | | |
|---|---|---|---|---|
| 1,980,588 | A | * 11/1934 | Hopp | ..................... A23G 9/503 426/134 |
| 2,085,330 | A | * 6/1937 | Price | ..................... A23G 3/563 426/134 |
| 4,229,482 | A | 10/1980 | Kreske, Jr. | |
| 5,515,203 | A | 5/1996 | Nye | |

(Continued)

OTHER PUBLICATIONS

CakeCentral. http://web.archive.org/web/20180514022812/https://www.cakecentral.com/forum/t/651353/sugar-glass-for-camera-cake-help. Published Sep. 13, 2009.*

(Continued)

*Primary Examiner* — Collin X Beatty
(74) *Attorney, Agent, or Firm* — Snell & Wilmer, L.L.P.

(57) ABSTRACT

Functional optical equipment such as lenses, prisms, optical flats, and color filters are made from hard candy, resulting in working optics that can be treated as either experimental equipment or confectionaries. These hard candy optics are manufactured by an extremely precise casting process, which avoids the need to polish or reshape the candy after casting and allows for the production of a wider selection of optical equipment. This process also allows the inclusion of features that expand the applications of the hard candy optics, but are not themselves optically functional.

17 Claims, 7 Drawing Sheets

(56) References Cited

U.S. PATENT DOCUMENTS

| | | | |
|---|---|---|---|
| 6,054,158 A * | 4/2000 | Hart | A23G 3/50 |
| | | | 426/104 |
| 6,416,800 B1 | 7/2002 | Weber | |
| 6,955,450 B2 | 10/2005 | Johnson | |
| 2003/0087007 A1* | 5/2003 | Summers | A23G 3/50 |
| | | | 426/104 |
| 2008/0069933 A1* | 3/2008 | Ison | A23P 10/25 |
| | | | 426/548 |
| 2009/0146330 A1* | 6/2009 | Chang | B29D 11/00038 |
| | | | 264/1.38 |
| 2011/0027430 A1 | 2/2011 | Davidovici | |
| 2012/0171335 A1 | 7/2012 | Shecter | |
| 2014/0049846 A1* | 2/2014 | Wang | G02B 3/0031 |
| | | | 359/793 |
| 2016/0123552 A1* | 5/2016 | Okuno | C09D 175/16 |
| | | | 362/311.04 |

OTHER PUBLICATIONS

"Cook Up an Edible Magnifying Glass", retrieved from http://www.instructables.com/id/Cook-up-an-Edible-Magnifying-Gass/?ALLSTEPS on Feb. 7, 2017, pp. 1-12.

* cited by examiner

HARD CANDY OPTICS

CROSS-REFERENCE TO RELATED APPLICATIONS

The present application claims priority to U.S. Provisional Application No. 62/292,389 entitled "FUNCTIONAL HARD CANDY OPTICS AND A METHOD FOR PRODUCING THE SAME" and filed on Feb. 8, 2016, the contents of which are incorporated by reference herein in their entirety.

FIELD OF THE DISCLOSURE

The present invention relates generally to optics. More particularly, the present invention relates to lenses, prisms, optical flats, and color filters constructed from hard candy, and the process of making the same.

BACKGROUND

Lenses, prisms, optical flats, and color filters (hereinafter collectively referred to as 'optics') are commonly used in laboratories and in equipment such as cameras, telescopes, magnifying glasses, and binoculars. The performance of an optic depends on three major characteristics: transparency in the spectrum of interest, shape, and refractive index.

In order for a material to be suitable for constructing an optic, it must absorb very little of the wavelengths it is intended to transmit—for example, a magnifying glass intended to be used by the naked eye should absorb very little of the visible spectrum. Suitable materials must also be able to hold a shape related to the intended function of the optic—for example, a plano-convex lens includes one flat and one convex surface, so a material may be suitable for constructing a plano-convex lens if the material can be formed into a shape with one flat and one convex surface. The refractive index of an optic determines how the path of a beam of light will be altered by the optic; a prism spreads white light into a rainbow due to each wavelength of the rainbow experiencing a different refractive index.

The quantitative traits of an optic, such as focal length and acceptance angle, are determined by a combination of the shape and the refractive index of the optic; a lower refractive index material uses a smaller radius of curvature to achieve the same focal length in a lens, and a higher refractive index material will result in a prism with a larger acceptance angle. Design constraints such as size or feasibility of construction may restrict what materials are valid for construction of an optic due to placing constraints on the refractive index.

Optics are usually constructed partially or entirely from a glass or plastic, or, less commonly, from a transparent liquid. These materials satisfy the three major characteristics listed above, and methods of constructing optics from these materials are widely known.

Although optics are present in many widely-used consumer products and technical equipment, the details of their construction and function are minimal or absent in most science curricula. This can, in part, be attributed to the fragility and cost of conventional optics; shattered glass poses a danger to students, and most optics are too expensive to be replaced frequently in classrooms. In addition, because glass and plastic require special training and equipment in order to form optics, children often do not participate in the construction process.

Cost and difficulty of manufacture can also cause projects requiring custom-built optics to be prohibitively expensive, especially when the project requires many optic components or when iterations of the project result in the destruction or obsolescence of one or more optics.

Some alternatives to glass and plastic exist that partially address the above problems for construction of optics. For example, gelatin lenses have recently gained popularity as an educational tool. However, gelatin deforms easily under its own weight, and so is not suitable for the construction of many types of optics. Gelatin is also delicate and very sensitive to motion, which further restricts its use to certain orientations. Gelatin is therefore not a valid material for the majority of optical equipment, interactive educational experiences, or scientific projects, which all usually utilize a wide range of shapes and orientations, tolerance for motion, and durability.

Some current methods of lens construction result in a lens that must be polished after the initial casting. In order for these methods to result in a lens suitable for optical applications, special equipment is required, increasing the time and cost of lens fabrication. Some current methods also destroy the mold used for casting the lens, limiting the consistency of lenses formed using these methods.

SUMMARY

A method of manufacturing a hard candy optic may comprise providing a mold, the mold comprising a depression; coating the depression with a lubricant; heating a mixture comprising either table sugar, light corn syrup, and water, or isomaltitol and water; pouring the mixture into the depression; cooling the mixture, wherein the cooling cures the mixture into the hard candy optic; and removing the hard candy optic from the mold.

A hard candy optic may comprise a lens comprising a first surface and a second surface, wherein the lens comprises an index of refraction of about 1.5 or about 1.63.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Optics components, including lenses, prisms, optical flats, and color filters that are cheap, durable, safe, and of high enough optical quality to have real-world applications are disclosed herein. A wide variety of lenses, prisms, optical flats, and color filters with the above characteristics may be provided.

Optics made from hard candy may be manufactured using a method that results in consistent, optically-functional shapes. Hard candy may be a suitable material for optics. A method of preparing the hard candy may result in either clear or tinted optics, depending on the recipe. The entire fabrication process can be safely performed in the average home kitchen using common household items by anyone with rudimentary food preparation knowledge, making it both safe enough and simple enough to be used in educational settings.

Hard candy is a type of candy that does not deform under external pressure or its own weight. Optically-suitable hard candy is hard candy that is transparent in the appropriate wavelengths for the desired application of the optic. Optically-suitable hard candy is created by heating an appropriate mixture of sugars to a sufficiently-high temperature that the mixture will become hard when allowed to cool. The molten sugar mixture can then be shaped into its final form by pouring the mixture into appropriately-shaped molds and allowing it to cool.

Figure 1:
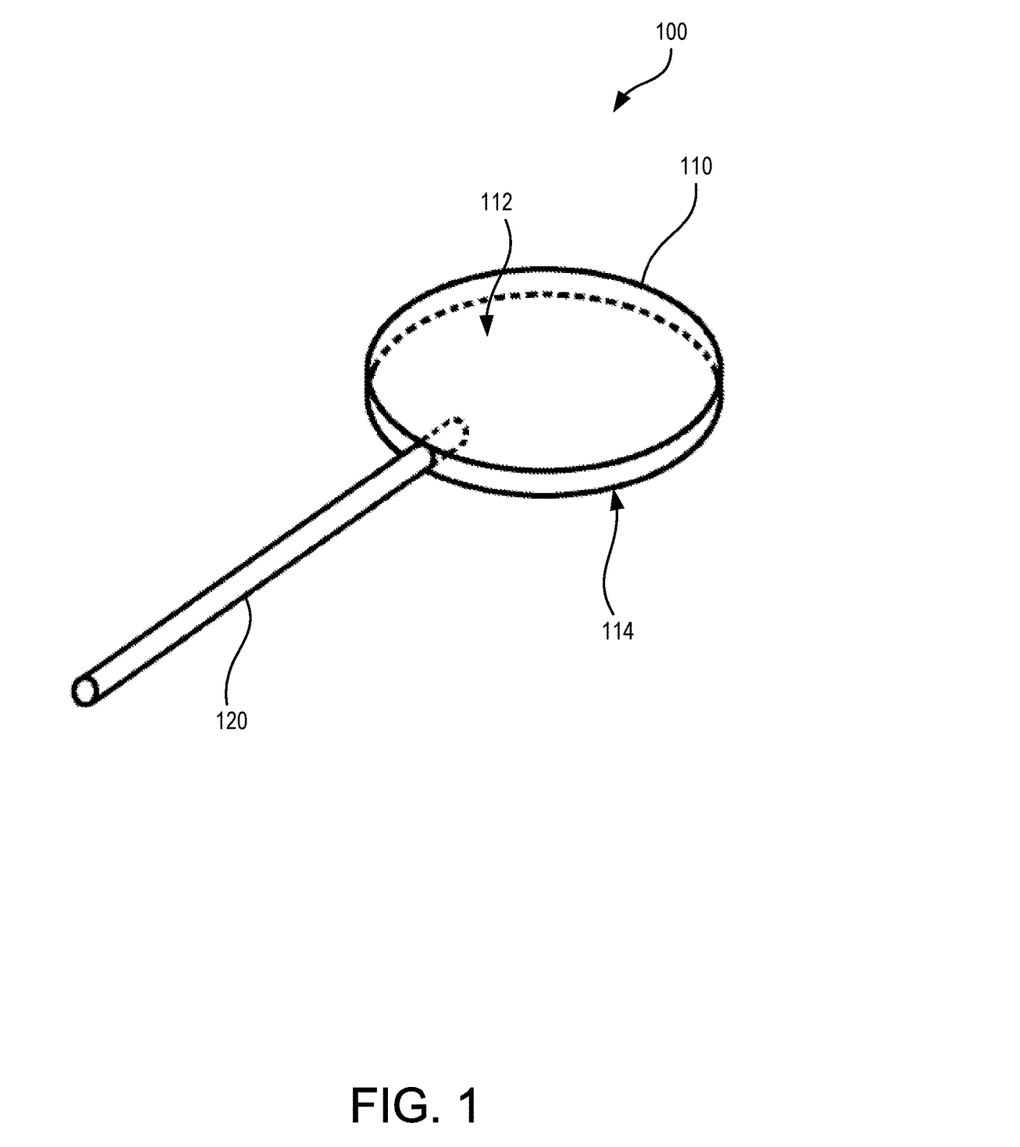
FIG. 1 illustrates a perspective view of a hard candy optic in accordance with various embodiments.

Referring to FIG. 1, a perspective view of a hard candy optic 100 is illustrated according to various embodiments. The hard candy optic 100 may comprise a lens 110 and a handle 120. The lens 110 may generally comprise the shape of a circular disk. The lens 110 may comprise a first surface 112 and a second surface 114. In various embodiments, the first surface 112 may be convex, concave, planar, cylindrical, spherical, axicon, or aspheric. Similarly, the second surface 114 may be convex, concave, planar, cylindrical, spherical, axicon, or aspheric. In various embodiments, the first surface 112 and/or the second surface 114 may be back-silvered with an edible reflective material, such that the lens forms a reflective mirror. In various embodiments, a non-edible reflective material, such as foil, may be coupled to the lens, and the reflective material may be removable. The combination of the shapes of the first surface 112 and the second surface 114 may control the path of light rays through or reflected by the hard candy optic 100.

In various embodiments, the handle 120 may be coupled to the lens 110 in such a way that the optical performance is only slightly impaired. This results in an optically-functional confectionery. The handle 120 may be located at least partially within the lens 110.

The handle 120 may allow the user to manipulate the hard candy optic 100 without leaving fingerprints or scratches on the optical surfaces. While some adults can be expected to have the caution and self-control necessary to avoid damaging or soiling an optic, children tend to be less careful. Thus, the handle 120 makes the hard candy optic 100 more suitable for educational use, as the optics are less likely to require cleaning or replacement during the lesson. In various embodiments, the handle 120 may comprise wood, hard candy, or a compressed paper or cotton material.

The handle 120 may transform the lens 110 into a popular form of candy, such as a lollipop. The lollipop shape may draw the attention of children, making them more willing to interact with the hard candy optic 100. The shape may also allow instructors the option of treating the hard candy optic 100 as both an instructional tool and a reward.

Figure 2:
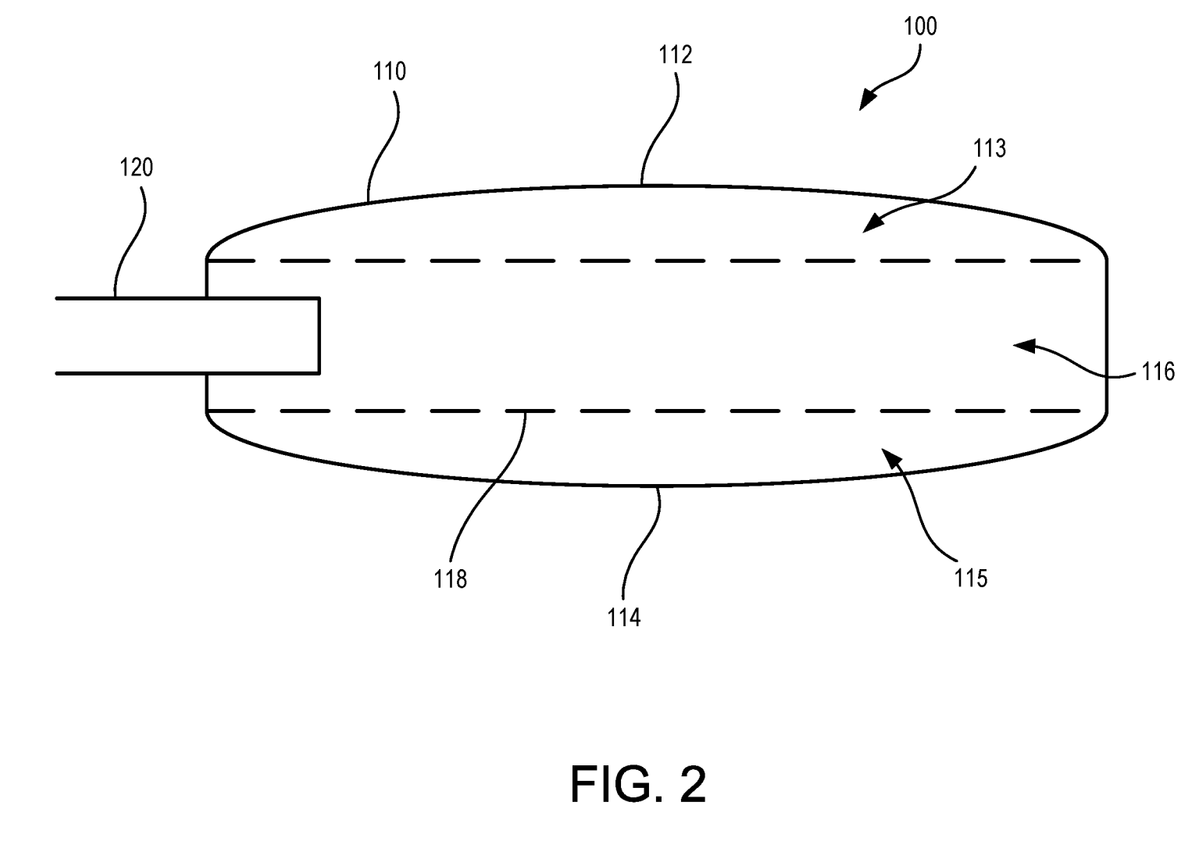
FIG. 2 illustrates a cross-section view of the hard candy optic in accordance with various embodiments.

Referring to FIG. 2, a cross-section view of the hard candy optic 100 is illustrated according to various embodiments. In the illustrated embodiment, the first surface 112 may comprise a convex surface, and the second surface 114 may comprise a convex surface. The handle 120 may be located within a central region 116 of the lens 110, the central region 116 being located between the first surface 112 and the second surface 114. In various embodiments, the lens 110 may comprise a clear hard candy. However, in various embodiments, one or more portions of the lens 110 may comprise a colored tint. In various embodiments, differently colored regions of the lens 110 may allow a user to create different functions of the lens 110 as the hard candy optic 100 is consumed. For example, a first outer region 113 comprising the first surface 112 may be clear, the central region 116 may be clear, and a second outer region 115 comprising the second surface 114 may comprise a red tint. Thus, initially the lens 110 may have two convex surfaces and have a red tint. However, a user may consume the second outer region 115 until reaching a planar interface 118 between the central region 116 and the second outer region 115, resulting in a clear lens with one convex surface 112 and one planar surface at the previous location of the planar interface 118. Those skilled in the art will recognize that many different color combinations may be used to form lenses of various shapes.

Figure 3:
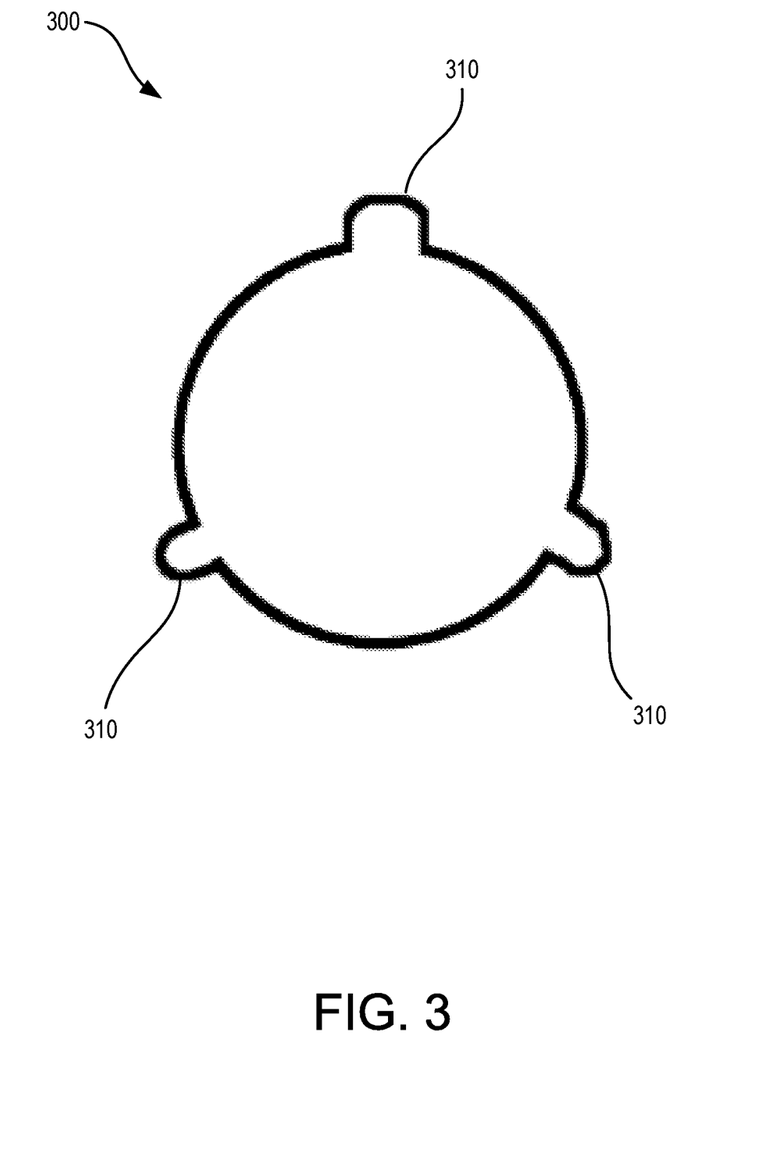
FIG. 3 illustrates plan view of a lens with hard candy handles in accordance with various embodiments.

Referring to FIG. 3, a plan view of a lens 300 comprising hard candy handles 310 is illustrated according to various embodiments. The hard candy handles 310 may protrude from the edge of the optically functional portion of the lens 300. The hard candy handles 310 may be formed in a molding process with the lens 300, such that the lens 300 including the hard candy handles 310 form a single unitary component. The hard candy handles 310 may allow a user to hold and manipulate the lens 300 without smudging or scratching the optical surfaces of the lens 300.

Figure 4:
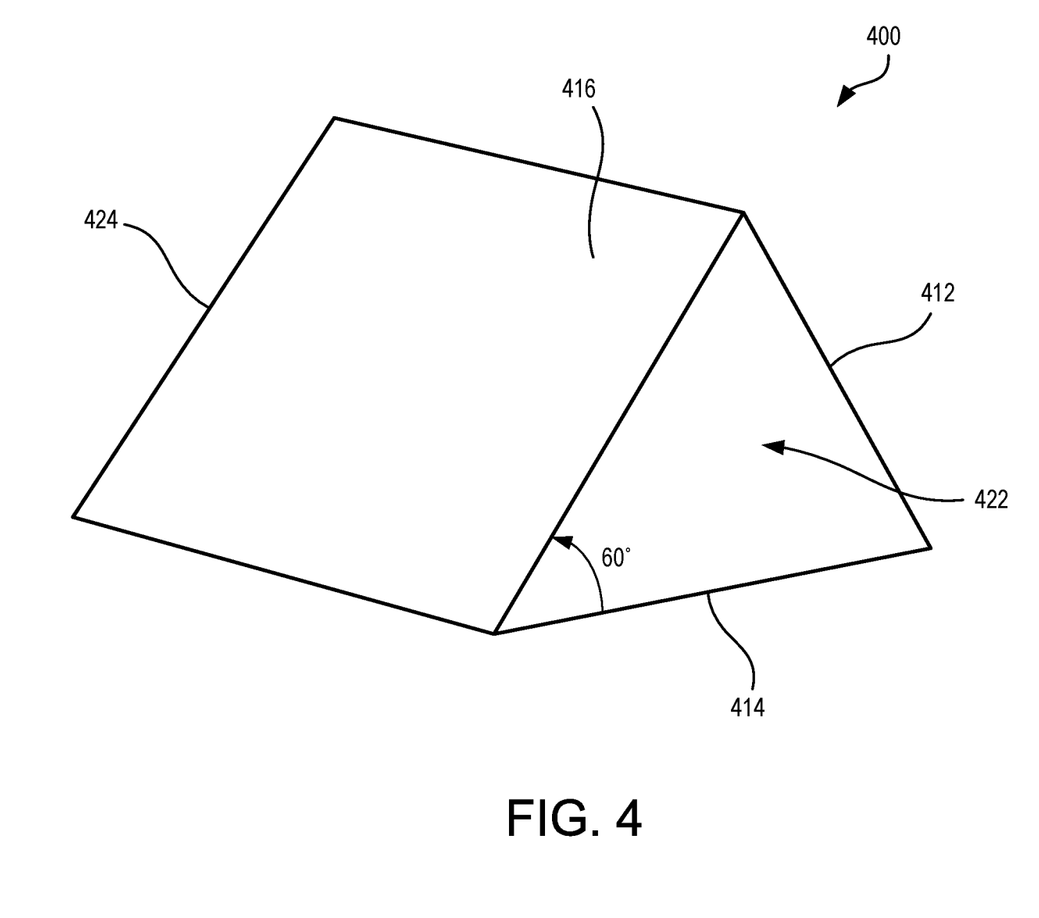
FIG. 4 illustrates a hard candy optic in the shape of a prism in accordance with various embodiments.

Referring to FIG. 4, a perspective view of a hard candy optic 400 in the shape of a prism is illustrated according to various embodiments. The hard candy optic 400 may comprise a first optical surface 412, a second optical surface 414, and a third optical surface 416. An angle between adjacent optical surfaces may be 60 degrees. The hard candy optic 400 may comprise a first end surface 422 and a second end surface 424. The first end surface 422 and the second end surface 424 may each be triangular. The hard candy optic 400 may separate white light into a rainbow due to each wavelength of the rainbow experiencing a different refractive index in the hard candy optic 400.

Figure 5:
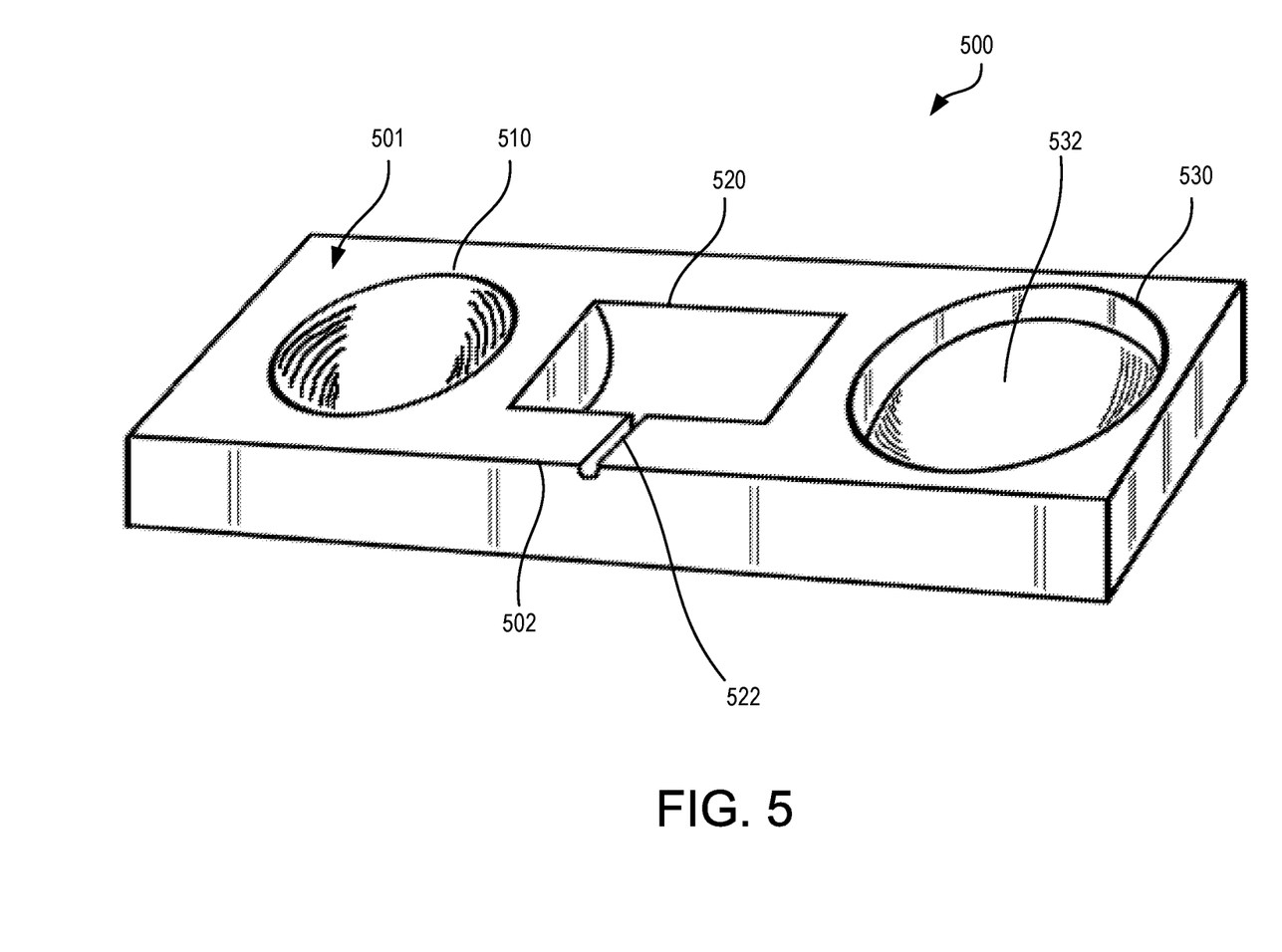
FIG. 5 illustrates a mold for casting hard candy lenses in accordance with various embodiments.

Referring to FIG. 5, a perspective view of a mold 500 for hard candy optics is illustrated according to various embodiments. The mold 500 may comprise one or more depressions in a face 501 of the mold 500 which may be used to form hard candy optics of various shapes. For example, the mold 500 may comprise a concave spherical depression 510 that can be used to produce a convex lens, such as a plano-convex lens. The mold 500 may comprise a concave cylindrical depression 520 that can be used to produce a convex cylindrical lens. The mold 500 may comprise a channel 522 connecting the edge 502 of the mold 500 to the concave cylindrical depression 520, allowing for the creation of a hard candy handle, or for the incorporation of an element such as a wooden or paper handle, or for the filling of the mold when the face 501 containing the depression is inaccessible. The mold 500 may comprise a cylindrical depression 530 with a convex lower surface 532. The cylindrical depression 530 may be used to produce a concave lens.

The mold 500 may comprise a solid piece of material that contain depressions in the shape of the negative of the final desired form of one or more hard candy optics. The mold 500 may be formed by imprinting, vacuum-forming, or mass-removal, and can be constructed from any material that can withstand the casting process. In the case of reusable hard candy optic molds, suitable materials include, but are not limited to, silicone, plastic, and metal. In various embodiments, the material of the mold 500 may be able to withstand temperatures of 275° F. without deforming or breaking and may not react with sugar.

In various embodiments, the mold 500 may comprise silicone. The mold 500 may be created using an initial template. The template may comprise solid objects of the desired shape of hard candy optics affixed to the bottom surface of a container such that mild force will not cause the objects to shift. The walls of the container may be at least 0.25 inches taller than the highest point of any object used in the template. The objects and container may all be impermeable to uncured (liquid) silicone. The objects may be glass or plastic optics, any object with an optically-suitable form, or objects of any other form that facilitate the fabrication of hard candy optics (such as lollipop sticks). Uncured silicone may be poured into the container until all objects are covered by at least 0.25 inches of silicone. The silicone may then be cured according to the type of silicone used. Possible curing methods include, but are not limited to, temperature-based curing, light-based curing, and time-based curing. Depending on the silicone used, the uncured silicone may be degassed before curing to remove air bubbles. Once the silicone is cured, it may hold the shape of the template when relaxed, but can be temporarily deformed to facilitate removal from the template or release of molded objects.

In various embodiments, the mold 500 may comprise plastic. The mold 500 may be formed using a similar template to the silicone mold process, but the objects may be affixed to a flat screen with no walls. The objects and screen may be able to withstand temperatures above the sag temperature of the plastic being used. Using a vacuum, air may be sucked from under the screen. A sheet of plastic may be heated until the plastic begins to deform under its own weight. The hot plastic is then draped over the template such that the plastic deforms into the shape of the objects, pulled against the objects by the vacuum to ensure faithful reproduction of the forms of the objects. The plastic is then allowed to cool. Once the plastic is cool, it permanently holds the shape of the template, but can be slightly deformed to facilitate removal from the template or release of molded objects.

In various embodiments, the mold 500 may comprise metal. The mold 500 may be formed by removing material from the surface of a piece of metal until the depression approximates the negative of the desired optic shape. The depression may then be polished. The smoother the depression, the smoother the surface of the resulting hard candy optic, and thus, the more light transmitted by the optic.

Although the silicone and plastic molds may be unsuitable for creating glass and plastic lenses due to the temperature requirements for creating glass and plastic lenses, the silicone and plastic molds may be capable of withstanding the temperature of liquid candy used to create hard candy optics.

Figure 6:
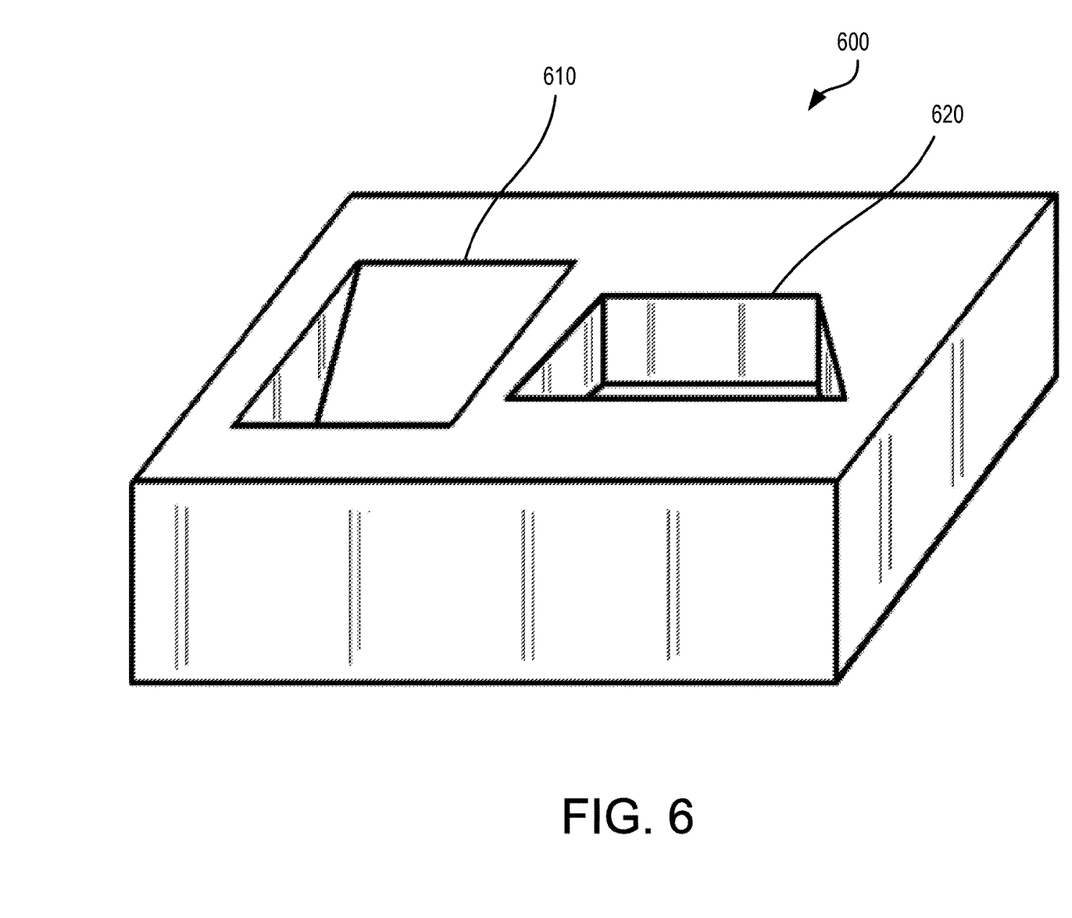
FIG. 6 illustrates a mold for casting hard candy prisms in accordance with various embodiments.

Referring to FIG. 6, a perspective view of a mold 600 for forming hard candy optics in the shape of prisms is illustrated according to various embodiments. The mold 600 may comprise a depression 610 in the shape of the negative of a Littrow prism. The mold 600 may comprise a depression 620 in the shape of the negative of a Dove prism. The depressions 610, 620 may be used to produce Littrow and Dove prisms, respectively.

Figure 7:
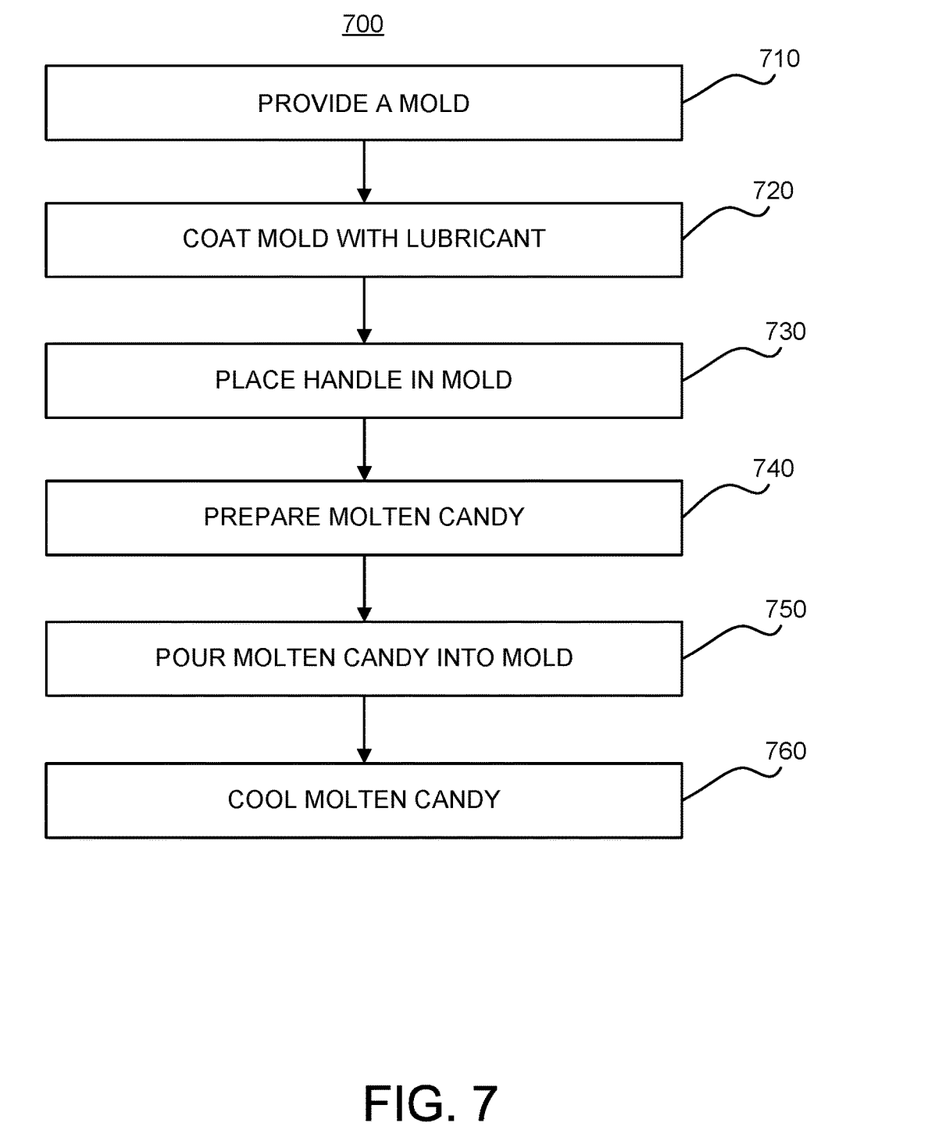
FIG. 7 illustrates a flowchart of a process for manufacturing hard candy optics in accordance with various embodiments.

Referring to FIG. 7, a flowchart 700 of a method of manufacturing a hard candy optic is illustrated according to various embodiments. The method may comprise providing a mold (step 710). If the desired hard candy optic should have one large, flat face, a single mold may be used. If the desired optic has no large, flat faces, two or more molds can be sandwiched together with a channel allowing for the mold to still be filled.

The mold may be coated with a lubricant (step 720). In various embodiments, only the depressions are coated. However, in various embodiments the entire mold may be coated. For a silicone mold, the mold may be coated with a thin layer of vegetable oil to prevent bubbles from forming within the hard candy optic as it cools. If the mold is left uncoated, the molten candy may heat air trapped within the silicone, causing the air to expand into the molten candy and create bubbles along the mold-candy interface. These bubbles may reduce the optical quality of the optic and create differences in behavior between optics made from the same mold.

For a plastic or metal mold, the mold may be coated with a thin layer of vegetable oil to facilitate the release of the hard candy optic from the mold. If the mold is left uncoated, the surface of the hard candy optic may become stuck to the mold after cooling. This may result in parts of the optic deforming or breaking while being separated from the mold, reducing consistency and optical quality of the optic.

Vegetable oil is nearly transparent to visible light, edible, cheap, and safe to use without special training or equipment, so the existence of a thin film of vegetable oil on the surface of a hard candy optic may not substantially change the performance, price, or applications of the optic. While vegetable oil is one type of lubricant used to manufacture hard candy optics due to its availability, other substances may also be suitable for mold preparation.

In various embodiments, a handle or other rigid object may be placed in the mold (step 730). A lollipop stick, screw, or other additional element can be incorporated into the hard candy optic to allow for easier manipulation and use of the optic. The mold may comprise space for the rigid object in the mold, and the rigid object may be positioned in the designated space before pouring the molten candy into the mold. The molten candy may surround and bind to the object, securely incorporating the object into the final hard candy optic.

A molten candy mixture may be prepared (step 740). Pure sucrose (table sugar) may not result in optically-suitable hard candy, due to the sucrose rapidly crystallizing during the cooling process; crystalline sucrose is opaque in the visible spectrum. However, adding glucose or fructose to sucrose may prevent crystallization of the sucrose, resulting in hard candy with only minor absorption across the visible spectrum. Sucrose-based optics may be prepared by combining two parts table sugar, one part light corn syrup, and one part distilled water over high heat. The sugars may dissolve in the water, preventing burning by allowing the heat to distribute more evenly throughout the mixture. As the temperature rises, the water will boil away, leaving a sugar mixture that is less than 1% water by volume. Once the temperature of the mixture reaches 303° F. (as measured by, for example, a candy thermometer or rapid cooling of a drop of mixture), the container may be removed from the heat source and partially submerged in cold water to prevent the temperature of the mixture from continuing to increase. If coloring or flavoring is desired, the dyes or flavorings are added immediately after the container is removed from the water and thoroughly stirred into the mixture. The mixture may then be uniformly held at 275° F. (by, for example, placing the container in an oven) for five minutes to eliminate air bubbles introduced by the boiling process. If no color is added, this method results in transparent optics with a slight golden tint and an index of refraction of about 1.5, similar to that of popular optical glasses. As used herein, "about" refers to +/−5%.

In various embodiments, isomaltitol may be used as an alternative to the above sucrose, fructose, and glucose mixture. Isomaltitol is a mixture of two parts glucose, one part mannitol, and one part sorbitol. Isomaltitol-based optics may be formed by combining three parts isomaltitol and one part distilled water over high heat. Again, the water will boil off as the temperature of the mixture rises. Once the temperature of the mixture reaches 333° F., the container is removed from the heat source and partially submerged in cold water to prevent the temperature of the mixture from continuing to increase. If coloring or flavoring is desired, the dyes or flavorings are added and thoroughly stirred into the mixture immediately after the container is removed from the water. The mixture is then uniformly held at 275° F. for five minutes. If no color is added, this method results in optics with very similar transparency to clear glass and an index of refraction of about 1.63.

Isomaltitol, unlike table sugar and light corn syrup, cannot be purchased in typical grocery stores. Optics made from isomaltitol are approximately twice as expensive as optics made from table sugar and light corn syrup, and exhibit superior resistance to humidity-catalyzed surface crystallization.

The preferred optic composition depends on the desired application of the optic; sucrose-based optics are generally suitable for recreational and educational activities involving small children, while isomaltitol optics are recommended for prototyping and experimental applications. Alternative compositions of hard candy can be evaluated for suitability using the criteria of transparency, refractive index, and cost.

The molten candy may be poured into the mold (step 750). The mixture is then allowed to cool for twenty minutes (step 760). Once the molten candy is cured, the hard candy optics may be removed from the mold in the form of a finished hard candy optic. In various embodiments, the described methods result in a hard candy optic in which no polishing or reshaping is required, which is an improvement over existing methods for creating hard candy lenses or glass optics. The finished hard candy optic may be used to conduct optical experiments, eaten, or wrapped for future use.

The disclosed methods may also be suitable for creating optics with features that are not optically relevant, but expand the applications of the optic. An appropriate mold will result in an optically functional hard candy optic with handles of additional material around the edge of the optic, allowing the optic to be securely held without impairing its optical properties. In various embodiments, a mold may comprise features that result in a hard candy optic with a threaded rim, allowing the optic to be screwed into a holder without incorporating additional elements.

The disclosed ingredients and processes are substantially cheaper than those of existing mass-produced optics, resulting in individual optics that may cost approximately one-tenth or less than the price of equivalent off-the-shelf optics. The disclosed processes may be nondestructive and scalable, which allows for even lower costs due to economies of scale. In various embodiments, the process may be completed in less than thirty minutes. This combination of cost and speed make the disclosed hard candy optics suitable for mass production and rapid prototyping applications.

Those skilled in the art will recognize that a wide variety of hard candy optics may be produced according to the present disclosure. For example, this method can produce lenses including, but not limited to, bi-convex, bi-concave, plano-convex, plano-concave, cylindrical, axicon, and aspheric lenses. In addition, this method can produce prisms in any shape currently sold by major optics suppliers, with similar size constraints to existing products. Standard optical flats and color filters can also be produced using this method.

While illustrative embodiments have been illustrated and described, it will be appreciated that various changes can be made therein without departing from the spirit and scope of the invention.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods and systems are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacturing a hard candy optic comprising:
   coating a depression comprised in a mold with a lubricant, wherein the lubricant comprises vegetable oil, wherein the lubricant is configured to improve an optical quality of the hard candy optic, wherein the depression comprises an inverse prism shape;
   heating a mixture comprising either:
   sucrose, light corn syrup, and water; or
   isomaltitol and water;
   pouring the mixture into the depression; and
   cooling the mixture, wherein the cooling cures the mixture into the hard candy optic comprising a resulting hard candy material;
   preventing, via the lubricant, bubbles from forming along a mold-candy interface during the cooling the mixture, thus improving the optical quality of the hard candy optic, wherein the hard candy optic comprises an optically-functional prism having desired optical properties that separates white light into a rainbow due to each wavelength of the rainbow experiencing a different refractive index in the optically-functional prism; and
   removing the hard candy optic from the mold,
   wherein the hard candy optic comprises an optics component and a hard candy handle protruding from the optics component, and
   wherein the optics component and the hard candy handle both comprise the hard candy material, such that the optics component and the hard candle handle are a single unitary component.

2. The method of claim 1, wherein the hard candy optic comprises a first surface and a second surface.

3. The method of claim 2, wherein the first surface comprises a convex surface, and wherein the second surface comprises a planar surface.

4. The method of claim 1, wherein the heating comprises heating the mixture to 333° F., and further comprising holding the mixture at 275° F. for at least five minutes.

5. The method of claim 1, further comprising inserting a handle into the mold prior to the pouring.

6. The method of claim 1, wherein the heating comprises heating the mixture to 303° F.

7. The method of claim 6, further comprising holding the mixture at 275° F. for at least five minutes.

8. The method of claim 1, wherein the mixture comprises sucrose, light corn syrup, water, and at least one of fructose and glucose, wherein the method further comprises preventing, via the at least one of fructose and glucose in the mixture, crystallization of the sucrose.

9. The method of claim 1, wherein the hard candy optic comprises an index of refraction of about 1.5 or about 1.63.

10. A method of manufacturing a hard candy optic, comprising:
    coating a depression in a mold with a lubricant, wherein the mold comprises silicone, wherein the lubricant comprises vegetable oil, wherein the lubricant is configured to improve an optical quality of the hard candy optic, wherein the depression comprises an inverse prism shape;
    heating a mixture comprising either:
    sucrose, light corn syrup, and water; or
    isomaltitol and water;
    pouring the mixture into the depression;
    cooling the mixture, wherein the cooling cures the mixture into the hard candy optic wherein the hard candy optic is optically-functional and comprises desired optical properties;
    preventing, via the lubricant, bubbles from forming along a mold-candy interface during the cooling the mixture, thus improving the optical quality of the hard candy optic; and
    removing the hard candy optic from the mold.

11. The method of claim 1, wherein the mixture comprises sucrose, light corn syrup, and water.

12. The method of claim 10, wherein the mixture comprises sucrose, light corn syrup, and water.

13. The method of claim 12, wherein the mixture further comprises at least one of fructose and glucose, wherein the method further comprises preventing, via the at least one of fructose and glucose in the mixture, crystallization of the sucrose.

14. A method of manufacturing a hard candy optic, comprising:
    coating a depression in a mold with a lubricant, wherein the lubricant comprises vegetable oil, wherein the lubricant is configured to improve an optical quality of the hard candy optic;
    heating a mixture comprising either:
    sucrose, light corn syrup, and water; or
    isomaltitol and water;
    pouring the mixture into the depression;
    cooling the mixture, wherein the cooling cures the mixture into the hard candy optic, wherein the hard candy optic is optically-functional and comprises desired optical properties;
    preventing, via the lubricant, bubbles from forming along a mold-candy interface during the cooling the mixture, thus improving the optical quality of the hard candy optic; and
    removing the hard candy optic from the mold.

15. The method of claim 14, wherein the depression comprises an inverse prism shape, such that the optics component is an optically-functional prism that separates white light into a rainbow due to each wavelength of the rainbow experiencing a different refractive index in the optically-functional prism.

16. The method of claim 15, wherein the mixture comprises sucrose, light corn syrup, and water.

17. The method of claim 16, wherein the mixture further comprises at least one of fructose and glucose, wherein the method further comprises preventing, via the at least one of fructose and glucose in the mixture, crystallization of the sucrose.

* * * * *